(12) United States Patent
Wang et al.

(10) Patent No.: US 10,587,021 B2
(45) Date of Patent: Mar. 10, 2020

(54) ALL SOLID STATE LITHIUM BATTERY

(71) Applicant: EC Power, LLC, State College, PA (US)

(72) Inventors: Chao-Yang Wang, State College, PA (US); Yan Ji, State College, PA (US); Tianren Xu, State College, PA (US)

(73) Assignee: EC POWER, LLC, State College, PA (US)

( * ) Notice: Subject to any disclaimer, the term of this patent is extended or adjusted under 35 U.S.C. 154(b) by 882 days.

(21) Appl. No.: 14/952,689

(22) Filed: Nov. 25, 2015

(65) Prior Publication Data

US 2016/0156081 A1 Jun. 2, 2016

Related U.S. Application Data

(60) Provisional application No. 62/086,084, filed on Dec. 1, 2014, provisional application No. 62/086,016, filed on Dec. 1, 2014.

(51) Int. Cl.
*H01M 10/6571* (2014.01)
*H01M 10/052* (2010.01)
(Continued)

(52) U.S. Cl.
CPC ..... *H01M 10/6571* (2015.04); *H01M 10/052* (2013.01); *H01M 10/615* (2015.04); *H01M 10/635* (2015.04); *H01M 10/637* (2015.04)

(58) Field of Classification Search
CPC ........................ H01M 10/6571; H01M 10/613
See application file for complete search history.

(56) References Cited

U.S. PATENT DOCUMENTS 3,569,666 A * 3/1971 Murphy ........... A41D 19/01535
126/204
5,849,431 A 12/1998 Kita et al.
(Continued)

FOREIGN PATENT DOCUMENTS

DE 102012210146 A1 12/2013
EP 2339687 A1 6/2011
(Continued)

OTHER PUBLICATIONS

International Preliminary Report on Patentability issued in Application No. PCT/US20151062696, dated Jun. 15, 2017, 11 pages.
(Continued)

*Primary Examiner* — Ula C Ruddock
*Assistant Examiner* — Thomas H. Parsons
(74) *Attorney, Agent, or Firm* — Morgan, Lewis & Bockius LLP

(57) ABSTRACT

Provided is an all solid-state lithium battery including solid battery materials and whose ohmic resistance is modulated according to temperature. The all solid-state lithium battery can include a solid electrolyte; at least two terminals for operating the battery at one level of internal resistance (R1) over a temperature range of the battery between a first temperature (T1) and a second temperature (T2); at least one high resistance terminal for operating the battery at a second level of internal resistance (R2) outside of either T1 or T2; and a switch that activates R2 when the temperature of the battery is outside of either T1 or T2. The battery can be configured to include at least one resistor sheet embedded within a cell of the battery and electrically connected to the at least one high resistance terminal.

20 Claims, 7 Drawing Sheets

(51) Int. Cl.
H01M 10/615 (2014.01)
H01M 10/635 (2014.01)
H01M 10/637 (2014.01)

(56) References Cited

U.S. PATENT DOCUMENTS

| | | | |
|---|---|---|---|
| 6,072,301 | A | 6/2000 | Ashtiani et al. |
| 6,441,588 | B1 | 8/2002 | Yagi et al. |
| 7,993,782 | B2 | 8/2011 | Takada et al. |
| 8,334,675 | B2 | 12/2012 | Wang et al. |
| 9,204,496 | B2* | 12/2015 | Hanada .............. H05B 3/845 |
| 2001/0049050 | A1 | 12/2001 | Aragane et al. |
| 2006/0275653 | A1* | 12/2006 | Chang ................ H01M 2/34 429/62 |
| 2009/0087723 | A1 | 4/2009 | Inda |
| 2010/0173179 | A1 | 7/2010 | Matthias |
| 2010/0264883 | A1 | 10/2010 | Aiura |
| 2012/0025773 | A1 | 2/2012 | Wang et al. |
| 2012/0032642 | A1 | 2/2012 | Xu et al. |
| 2012/0043942 | A1* | 2/2012 | Tamane .............. H01M 4/38 320/136 |
| 2012/0098481 | A1 | 4/2012 | Hunter et al. |
| 2013/0108896 | A1* | 5/2013 | Daniel ............... B60L 11/1866 429/50 |
| 2013/0234648 | A1 | 9/2013 | Kelty et al. |
| 2013/0288089 | A1 | 10/2013 | Kinoshita et al. |
| 2014/0285135 | A1 | 9/2014 | Ji et al. |
| 2014/0333267 | A1* | 11/2014 | Crawley ............. H02J 7/0052 320/150 |
| 2014/0342194 | A1 | 11/2014 | Wang et al. |
| 2015/0104681 | A1 | 4/2015 | Wang et al. |
| 2015/0188204 | A1* | 7/2015 | Hanada ............... H05B 3/20 429/62 |
| 2015/0303444 | A1 | 10/2015 | Wang et al. |

FOREIGN PATENT DOCUMENTS

| | | | |
|---|---|---|---|
| EP | 2410591 | A1 | 1/2012 |
| EP | 2581257 | A2 | 4/2013 |
| JP | 09-092335 | A | 4/1997 |
| JP | 2002-369402 | A | 12/2002 |
| JP | 2004-039523 | A | 2/2004 |
| JP | 2004-39523 | A | 2/2004 |
| JP | 2004-063397 | A | 2/2004 |
| JP | 2009-118729 | A | 5/2009 |
| JP | 2010-205710 | A | 9/2010 |
| JP | 2010205710 | * | 9/2010 |
| JP | 2012-069280 | A | 4/2012 |
| JP | 2012-069496 | A | 4/2012 |
| JP | 2013-164977 | A | 8/2013 |
| WO | 2013/186079 | A1 | 12/2013 |

OTHER PUBLICATIONS

Fan, J. et al., "Studies on Charging Lithium-Ion Cells at Low Temperatures," Journal of The Electrochemical Society, (2006) 153 (6) A1081-A1092.
Huang, C.K. et al., "The Limits of Low-Temperature Performance of Li-Ion Cells," Journal of The Electrochemical Society, (2000) 147 (8) 2893-2896.
Ji, Y. et al., "Li-ion cell operation at low temperatures", J. Electrochemical Society, (2013) 160(4) A636-A649.
Ji, Y. et al. (CY Wang), "Heating strategies for Li-ion batteries operated from subzero temperatures", Electrochimica Acta (2013) 107:664-674.
Lin, H.P. et al., "Low-Temperature Behavior of Li-Ion Cells," Electrochemical Solid-State Letters, (2001) 4 (6) A71-A73.
Nagasubramanian, G., "Electrical characteristics of 18650 Li-ion cells at low temperatures," J Appl Electrochem, (2001) 31:99-104.
Pesaran, A. et al., "Cooling and Preheating of Batteries in Hybrid Electric Vehicles," The 6th ASME-JSME Thermal Engineering Joint Conference, Hawaii Island, Hawaii, 2003.
Smart, M.G. et al., "Electrolytes for Low-Temperature Lithium Batteries Based on Ternary Mixtures of Aliphatic Carbonates," Journal of The Electrochemical Society, (1999) 146 (2) 486-492.
Smart, M.C. et al., "Use of Organic Esters as Cosolvents in Electrolytes for Lithium-Ion Batteries with Improved Low Temperature Performance," Journal of the Electrochemical Society, (2002) 149 (4) A361-A370.
Zhang, S.S. et al., "Charge and discharge characteristics of a commerical LiCoO2-based 18650 Li-ion batter," Journal of Power Sources, (2006) 160:1403-1409.
Zhang, S.S. et al., "Electrochemical impedance study on the low temperature of Li-ion batteries," Electrochim Acta, (2004) 49:1057-1061.
Zhang, S.S. et al., "The low temperature performance of Li-ion batteries," J. of Power Sources, (2003)115:137-140.
Zhang, S.S.et al., "Low temperature performance of graphite electrode in Li-ion cells," Electrochimica Acta, (2002) 48:241-246.
Zolot, M.D. et al., "Thermal Evaluation of the Honda Insight Battery Pack," in: 36th Intersociety Energy Conversion Engineering Conference, Savannah, GA, 2001, pp. 923.
International Search Report and Written Opinion issued in corresponding International Patent Application No. PCT/US2014/034209, dated Sep. 2, 2014; 10 pages.
International Search Report and Written Opinion issued in corresponding International Patent Application No. PCT/US2014/059729, dated Jun. 29, 2015; 12 pages.
International Search Report and Written Opinion issued in corresponding International Patent Application No. PCT/US2014/059726, dated Jun. 26, 2015; 13 pages.
International Search Report and Written Opinion dated Oct. 27, 2015 issued in International Patent Applicaton No. PCT/US2015/042304.
U.S. Appl. No. 14/189,517, filed Feb. 25, 2014.
U.S. Appl. No. 14/267,678, filed May 1, 2014.
U.S. Appl. No. 14/255,780, filed Apr. 17, 2014.
International Search Report and Written Opinion issued in Application No. PCT/US2015/062696 dated Apr. 8, 2016.
Philippe Knauth, "Inorganic solid Li ion conductors: An Overview", Solid State Ionics 180 (2009) pp. 911-916.
Zengcai Liu et al., "Anomalous High Ionic Conductivity of Nanoporous βLi3Ps4", Journal of American Chemical Society, 2013, 135, pp. 975-978.
Rachna Khurana et al., "Suppression of Lithium Dendrite Growth Using Cross-Linked Polyethylene/Poly(ethylene oxide) Electrolytes: A New Approach for Practical Lithium-Metal Polymer Batteries", Journal of the American Chemical Society, 2014, 136, pp. 7395-7402.
Renaud Bouchet et al., "Single-ion BAB triblock copolymers as highly efficient electrolytes for lithium-metal batteries", Nature Materials, vol. 12, May 2013, pp. 452-457.
Translation of First Office Action issued in Chinese Patent Application No. 201580062295.8 dated Apr. 3, 2019.
Communication pursuant to Article 94(3) EPC issued in European Application No. 15 864 852.7-1108 dated Mar. 5, 2019.
Extended European Search Report issued in Application No. 15864852.7 dated Jun. 20, 2018.
Office Action issued in Japanese Patent Application No. 2017-527592 dated Oct. 1, 2019, with English translation.

* cited by examiner

ALL SOLID STATE LITHIUM BATTERY

CROSS-REFERENCE TO RELATED APPLICATIONS

This application claims the benefit of U.S. Provisional Application Nos. 62/086,084 and 62/086,016 both of which were filed Dec. 1, 2014.

TECHNICAL FIELD

The present invention relates generally to rechargeable batteries, and more particularly, to rechargeable batteries composed of solid electrode materials and a solid electrolyte and capable of rapid heat-up from ambient temperatures to temperatures that are optimal for battery operation. Such batteries can have better energy density, power density, safety, and/or thermal management features and are useful for electronics, vehicles, and grid energy storage.

BACKGROUND

An all solid-state lithium battery (ASLB) uses a solid state electrolyte such as a solid polymer, an inorganic lithium ion conductor, or a single-ion conductor. Coupled with lithium metal as an anode, these batteries exhibit higher energy density than lithium ion batteries employing liquid electrolytes. In addition, the solid electrolyte is nonflammable and blocks dendritic growth of lithium metal, thereby providing much improved safety.

However, ASLBs commonly suffer from low ionic conductivity of the electrolyte at room temperature. As such, ASLBs generate low to no power at room temperature and require elevated temperatures such as at 60-80° C. to operate effectively. In some situations, an ASLB may have to operate at elevated temperatures in order to enhance its kinetics and transport properties in order to produce high power and high energy density simultaneously as well as to compensate for heat removal driven by a large difference between the battery temperature and the ambient.

U.S. patent application publication number US2014/0342194 discloses rechargeable batteries with multiple resistance levels. The publication discloses that the batteries can be configured to operate at a higher resistance level when the internal temperature of the battery is below an optimum temperature thereby heating the battery and improving battery performance.

However, there is a need to rapidly and efficiently raise the operating temperature of an ASLB despite operating in a low ambient temperature. Moreover, it is preferable to raise the reaction temperature at the electrochemical interface inside an ASLB where electrical power is generated.

SUMMARY OF THE DISCLOSURE

The present disclosure relates to configurations of an all solid-state lithium battery that are capable of rapidly and efficiently raising the temperature of the battery, e.g., raising the temperature to an optimal operating temperature range from ambient conditions. An advantage of the present invention is an ASLB engineered to have its internal resistance managed to change substantially according to battery temperature. Such a mechanism can cause rapid internal temperature rise in an ASLB operated from ambient temperatures. In certain aspects of the present disclosure, the ohmically modulated ASLB includes one or more resistor sheets embedded within stacks or jelly-rolls of electrode-electrolyte sheets of a conventional ASLB and possesses three terminals for operating the battery: a positive terminal, a negative terminal and a high-resistance terminal, e.g., a high resistance negative terminal.

These and other advantages are satisfied, at least in part, by an all solid-state lithium battery comprising: a solid electrolyte; at least two terminals, e.g., at least one negative terminal and at least one positive terminal, for operating the battery at one level of internal resistance ($R_1$) over a temperature range of the battery between a first temperature ($T_1$) and a second temperature ($T_2$); at least one high resistance terminal for operating the battery at a second level of internal resistance ($R_2$) outside of either $T_1$ or $T_2$; and a switch that activates $R_2$ when the temperature of the battery is outside of either $T_1$ or $T_2$. The rechargeable battery can have additional resistance levels, e.g., a third resistance level ($R_3$) associated with a third temperature ($T_3$) or over a third temperature range ($T_3$, $T_4$), and so forth.

Embodiments of the present disclosure include wherein the value of $R_2/R_1$ is between and including 2 to 500, e.g., the value of $R_2/R_1$ is between and including 2 to 100, or 2 to 50, when the value of $R_2$ is determined at about 2° C. below $T_1$ and $R_1$ is determined at $T_1$. Additional or alternative embodiments include wherein the value of $R_2/R_1$ is between and including 2 to 500, e.g., the value of $R_2/R_1$ is between and including 2 to 100, or 2 to 50, when the value of $R_2$ is determined at about 2° C. above $T_2$ and $R_1$ is determined at $T_2$.

In certain aspects of the present disclosure, an all solid-state lithium battery includes the at least one high resistance terminal electrically connected to at least one resistor sheet within a cell of the battery. That is, the resistor sheet can be adjacent or directly in contact with internal cell components such as an anode electrode or cathode electrode. For example, the all solid-state lithium battery can include one or more resistor sheets sandwiched within stacks or jelly-rolls of electrode-electrolyte sheets of a conventional ASLB. In some embodiments, the at least one resistor sheet is flat with a large surface area and in direct contact with components in a cell of the battery. The all solid-state lithium battery of the present disclosure can have three terminals for operating the battery and can have a plurality of electrochemical cells including one or more resistor sheets. The terminals allow operation of the battery at a low-resistance level $R_1$ or at a high-resistance level $R_2$. The three terminals can include either of one positive and two negative terminals or two positive terminals and one negative terminal. The former configuration is preferred. The two same-polarity terminals can further be connected by a switch that is self-activated thermally or driven by a temperature controller such that the battery switches between the terminals for operating the battery at $R_1$ and the terminals for operating the battery at $R_2$, depending on the battery temperature.

Embodiments of such a battery include wherein the at least one resistor sheet is configured to have at least two tabs, with one tab electrically connected to other electrode tabs in the battery to form a low-resistance terminal, and the other tab of the at least one resistor sheet electrically connected to the at least one high-resistance terminal. The three terminal configuration allows operation of the battery at a low-resistance level $R_1$ or at a high-resistance level $R_2$. The two negative terminals can further be connected by a switch that is thermally self-activated or driven by a temperature controller such that the battery switches between the terminals for operating the battery at $R_1$ over a temperature range between a first temperature ($T_1$) and a second temperature ($T_2$) and the terminals for operating the battery at $R_2$ when the temperature of the battery is outside of either $T_1$ or $T_2$.

Advantageously, such batteries can be operated at one internal resistance level over one temperature range and at other internal resistance levels at other temperatures or ranges. The difference between various internal resistance levels, e.g. $R_1$ and $R_2$, can be a factor of two to fifty or higher. The temperature points for abrupt change in internal resistance, i.e. $T_1$ and $T_2$, can be 40° C. and 90° C. respectively.

Switching between different resistance levels can create rapid internal heating at low temperatures and/or improved safety of ASLBs at high temperatures. For example, when the ambient temperature is lower than $T_1$, the battery will operate at its high internal resistance $R_2$, which can generate tremendous internal heat to rapidly warm-up the battery to an optimal temperature such as 60-80° C. The internal heating in an ASLB according to the present disclosure can be uniform and energy efficient. After the battery temperature reaches the optimal operating temperature, i.e. between $T_1$ and $T_2$, the battery switches to the low resistance $R_1$ to operate, thereby exhibiting high power and high performance. Under an extreme high temperature condition, e.g., during abuse or faulty events such as internal shorting where the battery temperature rises to an abnormally high value exceeding $T_2$, the battery's internal ohmic resistance can be increased sharply to $R_2$, thereby curbing the shorting current and local heat generation substantially. The combination of much lower maximum possible current and much lower internal heat generation rate gives rise to inherent safety of the battery at high temperatures.

Another aspect of the present disclosure includes an all solid-state lithium battery or system that includes a plurality of electrochemical storage cells that are arranged in more than one subgroup of cells, e.g., in modules. Each subgroup of cells can have one or more resistor sheets and each subgroup of cells can have one or more switches that can direct current through the one or more resistors sheets to form a High Resistance State or that can direct current to bypass the one or more resistors sheets to form a Low Resistance State. Operating such a battery or system allows one subgroup to be heated by electrical current from its own cells and/or current from other subgroup of cells, thus rapidly raising the temperature of the activated subgroup from an ambient level to an optimal operating level. Other subgroups can then be activated by the subgroup operating at an optimal temperature and/or other subgroup of cells.

Another aspect of the present disclosure includes a battery system comprising the all solid-state lithium battery according to any of the foregoing features and/or embodiments individually or in combination. The system can also include a controller that can switch between operating the battery at $R_1$ and operating the battery at $R_2$. In some embodiments, the system can include a temperature sensor for determining the temperature of $T_1$ and $T_2$. In other embodiments, the system includes an auxiliary battery to power the ASLB of the present disclosure to raise the temperature of the ASLB from an ambient level to an optimal operating level.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1A:
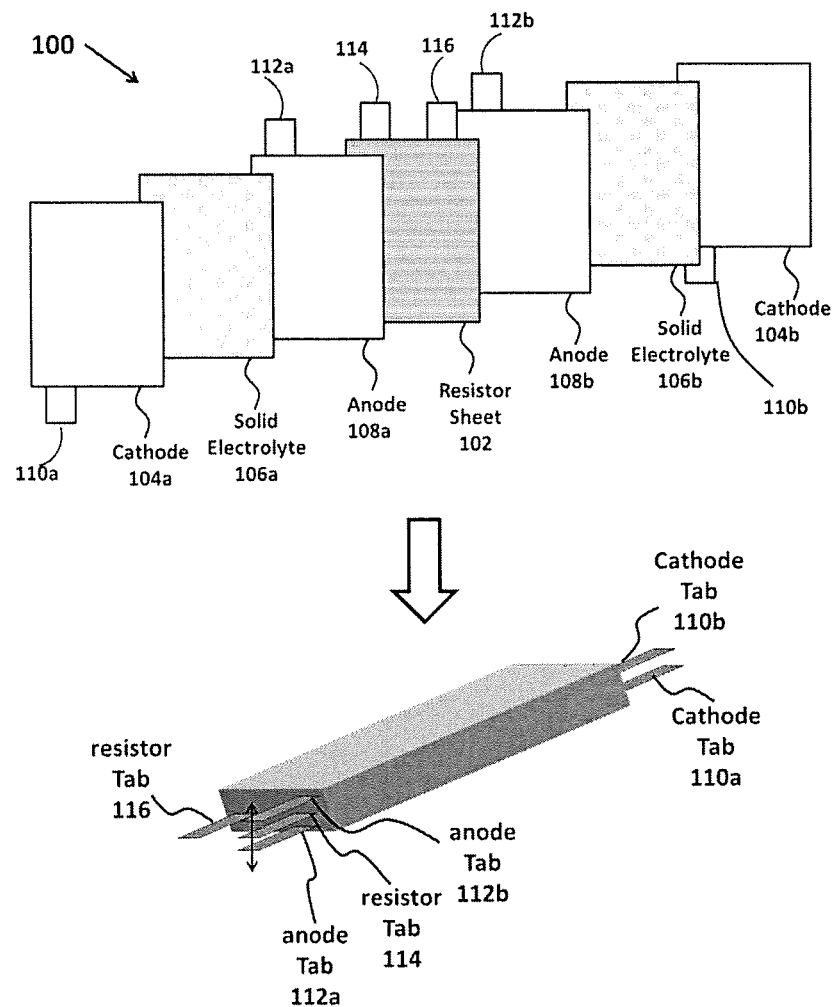
FIG. 1A is a schematic showing construction of an ASLB having a resistor sheet embedded within a stack of electrode-solid electrolyte assemblies and the resulting three terminals. The cathode tabs can be welded together to form one positive terminal (+); the anode tabs can be welded together with one of the two tabs of the resistor sheet to form one low-resistance negative terminal LoR(−); the other tab of the resistor sheet can be used as one high-resistance negative terminal HiR(−).

The present disclosure relates to an all solid-state lithium battery (ASLB) that can modulate its internal resistance according to temperature. As used herein the term an all solid-state lithium battery (ASLB) refers to a rechargeable lithium-ion battery using all solid materials including a solid-state electrolyte. Ohmic modulation of an ASLB or an ohmically modulated ASLB refers to an ASLB engineered to have more than one internal resistance levels that can change substantially with battery temperature.

Preferably, the ASLB can comprise one level of internal resistance ($R_1$) over a temperature range of the battery between a first temperature ($T_1$) and a second temperature ($T_2$), and a second level of internal resistance ($R_2$) outside of either $T_1$ or $T_2$. Preferably the value of $R_2$ changes abruptly, such as in a step function, or changes sharply, such as in a continuous but rapid change in resistance, below around $T_1$ and/or at above around $T_2$. For example, the value of $R_2$ at about 2° C. below $T_1$ is at least twice the value of $R_1$ at $T_1$ or the value of $R_2$ at about 2° C. above $T_2$ is at least twice the value of $R_1$ at $T_2$. Advantageously, the value of $R_2$ at about 2° C. below $T_1$ is at least twice to fifty times the value of $R_1$ at $T_1$ and the value of $R_2$ at about 2° C. above $T_2$ is at least twice to fifty times the value of $R_1$ at $T_2$. Embodiments of the present disclosure include wherein the value of $R_2/R_1$ is between and including 2 to 500, e.g., the value of $R_2/R_1$ is between and including 2 to 100, or 2 to 50, when the value of $R_2$ is determined at about 2° C. below $T_1$, and $R_1$ is determined at $T_1$. Additional or alternative embodiments include wherein the value of $R_2/R_1$ is between and including 2 to 500, e.g., the value of $R_2/R_1$ is between and including 2 to 100, or 2 to 50, when the value of $R_2$ is determined at about 2° C. above $T_2$ and $R_1$ is determined at $T_2$. The ohmic modulation of the battery is advantageously reversible, i.e., the internal resistance can switch back from $R_2$ to $R_1$ between $T_1$ and $T_2$.

Advantageously, the ASLB of the present disclosure can be readily configured with conventional components with minimal modification in certain embodiments. In general, the all solid-state lithium battery configuration of the present disclosure includes the basic elements of an anode electrode coated on a current collector, a cathode electrode coated on another current collector and a solid electrolyte. The ASLB can be in the faun of, for example, a pouch, cylindrical, prismatic or an angular form. Such batteries are useful for transportation, aerospace, military, and stationary energy storage applications. The ASLB can advantageously be configured with conventional materials and components.

For example, a conventional ASLB includes a positive electrode, a negative electrode, a solid electrolyte, a positive electrode current collector, a negative electrode current collector, and a battery enclosure such as an aluminum laminate pouch or a metal can. The positive electrode, coated on a current collecting foil (e.g. an Al foil), and the negative electrode, coated on another current collecting foil (e.g. an Cu foil), can be stacked or wound with the solid electrolyte layer interposed therebetween. The negative electrode can be made of lithium metal or substantially all lithium metal as in the form of a lithium metal foil or a composition including lithium powder, for example. The positive electrode can contain cathode active materials.

Solid-state electrolytes can be of polymeric nature, or inorganic nature, or a mixture of both. A polymer electrolyte normally contains a polymer with high lithium ion conductivity, a lithium ion source, certain content of mechanical stabilizing matrix, and certain content of plasticizer. Examples of lithium-conducting polymers include: poly(ethylene oxide), poly(acrylonitrile), poly(methyl methacrylate), poly(vinyl chloride), poly(vinylidene fluoride), poly(3-hexylthiophene), and a mixture or a co-polymer of the aforementioned polymers.

Different components of a polymer electrolyte can also be engineered to exist in a copolymer form. For example, the lithium-conducting polymer component and the mechanical stabilizer component of an electrolyte can exist in a single copolymer. For example, in a polymer electrolyte including poly(ethylene oxide)-poly(ethylene) copolymer (PE-PEO), the poly(ethylene oxide) (PEO) is the lithium-conducting component, while the poly(ethylene) (PE) is the mechanically stabilizing component. For a poly(2,6-dimethyl-1,4-phenylene oxide)-poly(ethylene oxide) copolymer (PXE-PEO), the PEO is the lithium-conducting component, while PXE is the mechanically stabilizing component. In another example, the lithium-conducting component, the mechanically stabilizing component, and the lithium salt can also exist in a copolymer form. For example, a BAB triblock copolymer of poly(styrene trifluoromethane-sulphonylimide of lithium)-poly(ethylene oxide)-poly(styrene trifluoromethane-sulphonylimide of lithium) (P(STFSILi)-PEO-P(STFSILi)) includes all three components. The BAB triblock contains PEO as the lithium-conducting component and P(STFSILi) as both the lithium ion source and the mechanically stabilizing matrix.

Inorganic solid electrolytes can be in crystalline state, or glass state, or a mixture of both. Normally, an inorganic electrolyte is an oxide compound or a sulfide compound, containing lithium ions. Examples of these electrolytes include: NASICON electrolytes such as $LiTi_2(PO_4)_3$, Garnet electrolytes such as $Li_7La_3Zr_2O_{12}$, LISICON electrolytes such as $Li_4SiO_4$, Perovskite electrolytes such as $(Lila)TiO_3$, sulfides such as $Li_{10}GeP_2S_{12}$, etc.

Both positive and negative electrodes can include active materials, afore-described solid electrolytes, binders and conducting agents if necessary. The cathode active materials include lithium cobalt oxide, lithium iron phosphate, lithium manganese oxide, lithium nickel-cobalt-manganese oxides, lithium-rich layered oxides, nickel-rich layered oxides, or their blends, sulfur, etc. Anode active materials can include lithium metal foil, lithium metal powders, graphite, silicon, silicon alloys, lithium alloys such as lithium titanate, and their blends. Common binders include PVDF (Polyvinylidene fluoride) and styrene-butadiene rubber (SBR) and sodium salt of carboxymethyl cellulose (CMC). Conducting agents are usually carbon-based, such as carbon black, carbon fibers, and mixed with the active materials to increase the electrode conductivity.

A battery of the present disclosure includes the above-described conventional components of an ASLB and additionally includes components to modulate the internal resistance of the battery.

In an embodiment shown in FIG. 1A, an ohmically modulated ASLB of the present disclosure includes a stack (100) having one or more resistor sheets (102) embedded within the stack of a cathode electrode, solid electrolyte, anode electrode assembly (104a, 106a, 108a and 108b, 106b, 104b). In this embodiment, resistor sheet 102 has two tabs (114 and 116) and each cathode electrode and anode electrode has one tab (e.g., 110a and 112a). Such electrode-electrolyte stacks can be assembled as jelly-rolls or other forms.

Additional embodiments of such a battery include wherein one tab of the at least one resistor sheet is electrically connected to the negative electrode tabs to form a low-resistance negative terminal, and the other tab of the at least one resistor sheet forms a high-resistance negative terminal. For example, the electrode-electrolyte stacks with the resistor sheet shown in FIG. 1A can be assembled to form a three terminal battery. The cathode tabs (110a and 110b) can be welded together to form one positive terminal (+); the anode tabs (112a and 112b) can be welded together with one of the two tabs (114) of the resistor sheet (102) to form one low-resistance negative terminal LoR(−); the other tab (116) of the resistor sheet (102) can be used as one high-resistance negative terminal HiR(−).

Figure 1B:
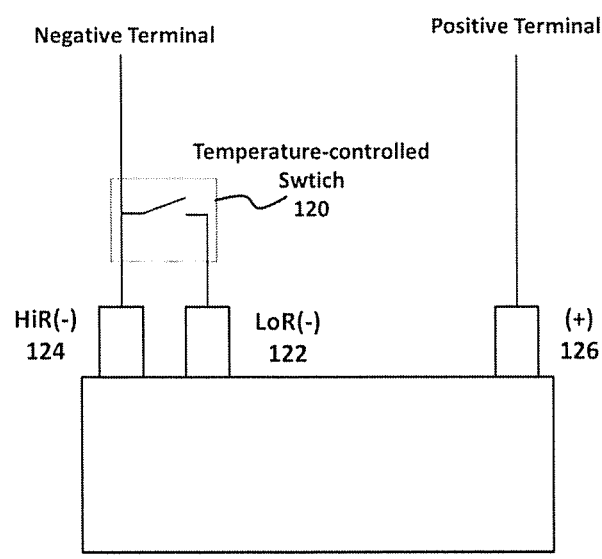
FIG. 1B illustrates an ASLB with three terminals, and a switch controlling the active state of LoR(−) and HiR(−), and hence the resistance level of the battery.

Such a rechargeable battery can include a switch that switches the resistance levels of the battery, as shown in FIG. 1B. For example, switch 120 can engage the low resistance terminals of the battery, i.e. LoR (−) 122 and (+) 126, to operate the battery when the temperature of the battery is between $T_1$ and $T_2$, and can engage the high resistance terminal, i.e. HiR(−) 124 and (+) 126, when the battery temperature is outside of either $T_1$ or $T_2$.

In operation, when the battery temperature is within in a normal operating range, defined as between a first temperature $T_1$ and a second temperature $T_2$, the switch is CLOSED and the battery current bypasses the resistor sheets since current prefers to flow through the low-resistance circuit. In this case, the battery operates between the terminals (+) and LoR(−), exhibiting a low internal resistance. When the battery temperature goes outside the normal range of $T_1$ and $T_2$, the switch is made OPEN, leaving the terminals (+) and HiR(−) operative. This forces the battery current to flow through the resistor sheets and hence exhibits high internal resistance.

The switch of the present disclosure can include those activated by thermally sensitive devices such as a glycol-water liquid capsule that expands upon freezing and pushes the switch open, a phase-change material that undergoes phase transition and appreciable volume change at $T_1$ or $T_2$ or both, or a bimetal switch, or a solid material whose volume expands appreciably at temperature $T_1$, or $T_2$ or both, for example.

The switch of the present disclosure can be composed of an electromechanical relay and a temperature controller, or a solid-state relay with a temperature sensor, a power MOSFET with a temperature sensor, or a high-current switch with a temperature sensor. Alternatively, the switch connecting LoR(−) and HiR(−) terminals can be carried out by a controller having an electric circuit and a cell temperature sensor in a battery management system.

As used herein, a resistor sheet is a material that has a similar or lower electrical conductivity relative to an unmodified current-collecting foil of a battery's electrode but causes a significant increase in the internal electrical resistance of the battery when activated during battery operation. The resistor sheet preferably has a resistance in units of Ohm equal to the numerical value of between 0.1 to 5 divided by the battery's capacity in Amp-hours (Ah), e.g. between about 0.5 to 2 divided by the battery's capacity in Ah. For example, the resistor sheet for a 20 Ah battery is preferably between about 0.005 Ohm (0.1 divided by 20) to about 0.25 Ohm (5 divided by 20), e.g. between about 0.025 Ohm (0.5 divided by 20) to about 0.1 Ohm (2 divided by 20).

The resistor sheets of the present disclosure can be any sufficiently conductive material that is stable when exposed to battery electrolytes and within the electrochemical voltage window of a rechargeable battery when the resistor sheet is exposed to such an environment. Such resistor sheets can be made of, for example, graphite, highly ordered pyrolytic graphite (HOPG), stainless steel, nickel, chrome, nichrome, copper, aluminum, titanium, or combinations thereof.

In certain embodiments, the resistor sheet of the present disclosure is preferably flat with a large surface area so that it can have good contact with adjacent battery components. The resistor sheets of the present disclosure can have a thickness between about 1 micrometer and about 150 micrometers with a preferred range of about 5 to about 60 micrometers. Resistor sheets that have large electrical resistance, high thermal conductivity, and small heat capacity are useful for certain embodiments of the present disclosure.

Figure 2A:
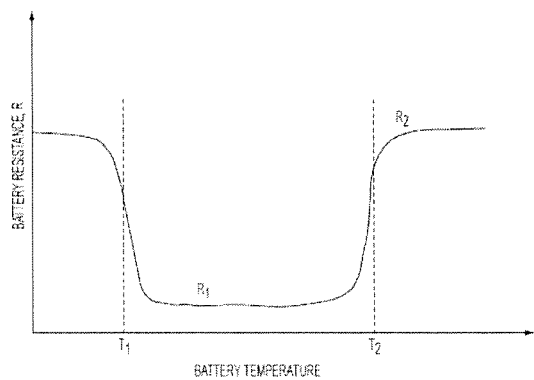
FIGS. 2A, 2B and 2C show three characteristic resistance curves of ohmically modulated, all solid-state lithium battery according to embodiments of the present disclosure.
Figure 2B:
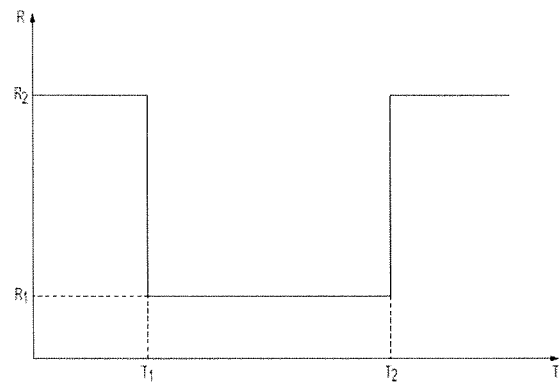

In one aspect, the ASLB of the present disclosure results in one level of internal resistance ($R_1$) over a temperature range of the battery between a first temperature ($T_1$) and a second temperature ($T_2$), and a second level of internal resistance ($R_2$) outside of either $T_1$ or $T_2$. An example of an idealized resistance to temperature relationship of such a rechargeable battery having two resistance levels is schematically illustrated in FIG. 2A and FIG. 2B.

Preferably the value of $R_2$ changes abruptly, such as in a step function (FIG. 2B), or changes sharply, such as in a continuous but rapid change in resistance (FIG. 2A), below around $T_1$ and/or at above around $T_2$. For example, the value of $R_2$ at about 2° C. below $T_1$ is at least twice the value of $R_1$ at $T_1$ or the value of $R_2$ at about 2° C. above $T_2$ is at least twice the value of $R_1$ at $T_2$. Advantageously, the value of $R_2$ at about 2° C. below $T_1$ is at least twice to fifty times the value of $R_1$ at $T_1$ and the value of $R_2$ at about 2° C. above $T_2$ is at least twice to fifty times the value of $R_1$ at $T_2$. Embodiments of the present disclosure include wherein the value of $R_2/R_1$ is between and including 2 to 500, e.g., the value of $R_2/R_1$ is between and including 2 to 100, or 2 to 50, when the value of $R_2$ is determined at about 2° C. below $T_1$ and $R_1$ is determined at $T_1$. Additional or alternative embodiments include wherein the value of $R_2/R_1$ is between and including 2 to 500, e.g., the value of $R_2/R_1$ is between and including 2 to 100, or 2 to 50, when the value of $R_2$ is determined at about 2° C. above $T_2$ and $R_1$ is determined at $T_2$. The ohmic modulation of the battery is advantageously reversible, i.e., the internal resistance can switch back from $R_2$ to $R_1$ between $T_1$ and $T_2$.

The ohmic modulation of the battery is advantageously reversible, i.e., the internal resistance can switch back from $R_2$ to $R_1$ when the temperature is between $T_1$ and $T_2$. In one aspect of the present disclosure, $T_1$ can be between and include a value of about 20-60° C., e.g., 40° C., and $T_2$ can be between and include a value of about 80-120° C., e.g., 90° C. Outside the optimal operating range between $T_1$, and $T_2$), the internal resistance of the battery jumps to the higher resistance level ($R_2$).

As used herein the temperature of the battery can be the internal temperature or external surface temperature of the battery. The ASLB of the present embodiment can be configured to operate at a higher resistance level when the internal temperature of the battery is below an optimum temperature, e.g. below $T_1$, thereby heating the battery and improving battery performance. That is, when the battery temperature starting from the ambient is lower than its optimal operating temperature, the internal resistance of the battery becomes several-fold higher. As a result, there is much intensified internal heating (as the battery's heat generation is proportional to its internal resistance), which leads to rapid warm-up of the battery. This in turn quickly improves power and energy output of the battery while operating at low ambient temperatures.

The process of rapid heat-up of the battery from an ambient temperature to the optimal elevated temperature via ohmic modulation is termed herein as activation. At a temperature below $T_1$, the battery is initially in a high resistance state. The activation process can include discharging the battery by a constant-voltage, constant-current (CVCC) cycle where the constant voltage is set, for example, between 0.1 and 1V and the current limit is set in a range from 1 C to 10 C. This activation process results in generation of significant internal heat within the battery, raising the battery temperature in a very short period of time, e.g. 15 seconds.

When the battery temperature reaches the optimal range, the ASLB of the present disclosure switches to the low resistance mode, able to output high power and energy. This activation process usually takes less than 30 seconds and consumes less than 3% of the battery capacity. Such energy-efficient activation to get the battery ready for high performance is a major advantage of the present invention.

The ASLB of the present disclosure can also be configured to switch to a high internal resistance once the battery's internal temperature exceeds the high end of the normal operating range, e.g. above $T_2$ such as above a value of between about 85-120° C. Temperatures that exceed the normal operating range depend upon several factors including the battery type. Such higher internal temperatures can occur during abuse or a faulty event or overcharging the battery. When the battery's temperature exceeds $T_2$, the ASLB of the present disclosure can switch to the high internal resistance causing much amplified voltage overshoot, thus facilitating early detection and shutdown of external charging systems before the battery enters a thermal runaway process.

In a short-circuit case, for example, the higher internal resistance will release battery energy at a slower and controlled rate, thereby slowing down the rate of the cell temperature rise and preventing the cell from thermal runaway. This high internal resistance feature at high temperatures gives rise to an inherent safety feature of the battery.

Figure 2C:
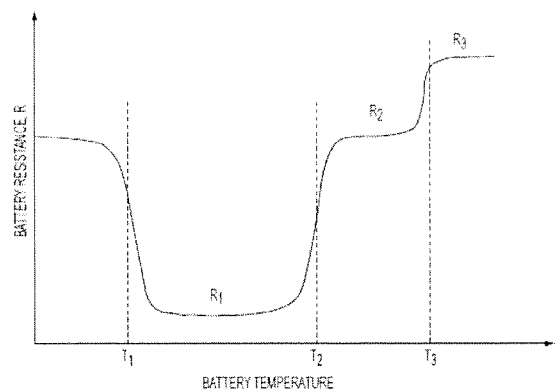

In another aspect of the present disclosure, the ASLB can include a third level of internal resistance ($R_3$) when the battery reaches a third temperature ($T_3$), as shown in FIG. 2C. Preferably, the value of $R_3$ changes abruptly or sharply above $T_3$, e.g., the value of $R_3$ at about 2° C. above $T_3$ is at least twice, e.g. at least 5, 10, 20 times or higher, than the value of $R_2$ at $T_3$. In one aspect of the present disclosure, $T_3$ is a temperature having a value between about 100° C. and about 130° C. Such a battery provides a double defense mechanism for the battery and improves the safety of the battery at high temperatures.

Figure 3A:
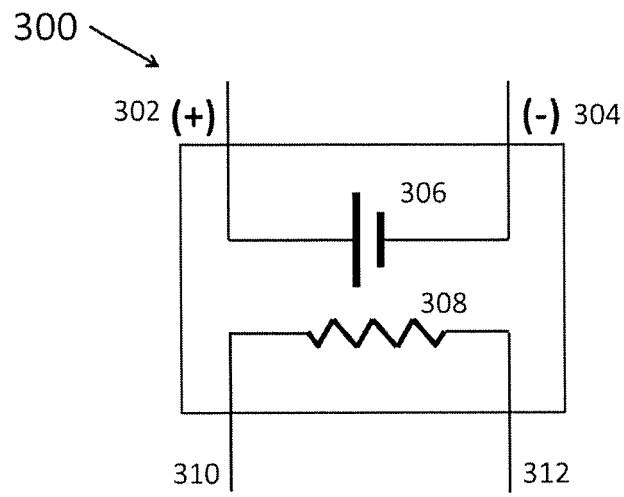
FIG. 3A shows an example of an ASLB cell with four terminals, e.g., a positive and negative terminal of the battery and the two independent terminals of the resistor sheet.

FIG. 3A schematically illustrates an embodiment of an all solid-state lithium battery of the present disclosure. As shown, the ASLB 300 includes one cell (306). The cell can include a cathode electrode, anode electrode and solid electrolyte (not shown for illustrative convenience). In this embodiment, the ASLB has four terminals. The ASLB includes a positive terminal (302) and a negative terminal (304) and two terminals (310 and 312) for resistor sheet 308. While the battery configuration in FIG. 3A is illustrated as a single cell with a single resistor sheet, the ASLB of the present disclosure can have more than one cell and/or more than one resistor sheet. Additionally, the one or more resistor sheets can be positioned between a pair of cells and/or around other positions near each or some of the cells.

Another aspect of the present disclosure includes an all solid-state lithium battery system having a plurality of cells each of which has a positive and negative terminal. The cells can be adjacent each other and electrically connected to each other in a parallel or in a series arrangement or combinations thereof. The system further includes a plurality of resistor sheets electrically connected to each other. The plurality of resistor sheets can be sandwiched between adjacent cells in the plurality of electrochemical storage cells and/or inside one or more cells of the plurality of electrochemical storage cells. The system can further include at least a first switch electrically connected to the plurality of electrochemical storage cells and electrically connected to the plurality of resistor sheets. Such a switch can form a low resistance circuit by electrically connecting the plurality of electrochemical storage cells in one state (Low Resistance State) and the switch can form a high resistance circuit by electrically connecting the plurality of electrochemical storage cells through the plurality of resistor sheets in another state (High Resistance State).

Figure 3B:
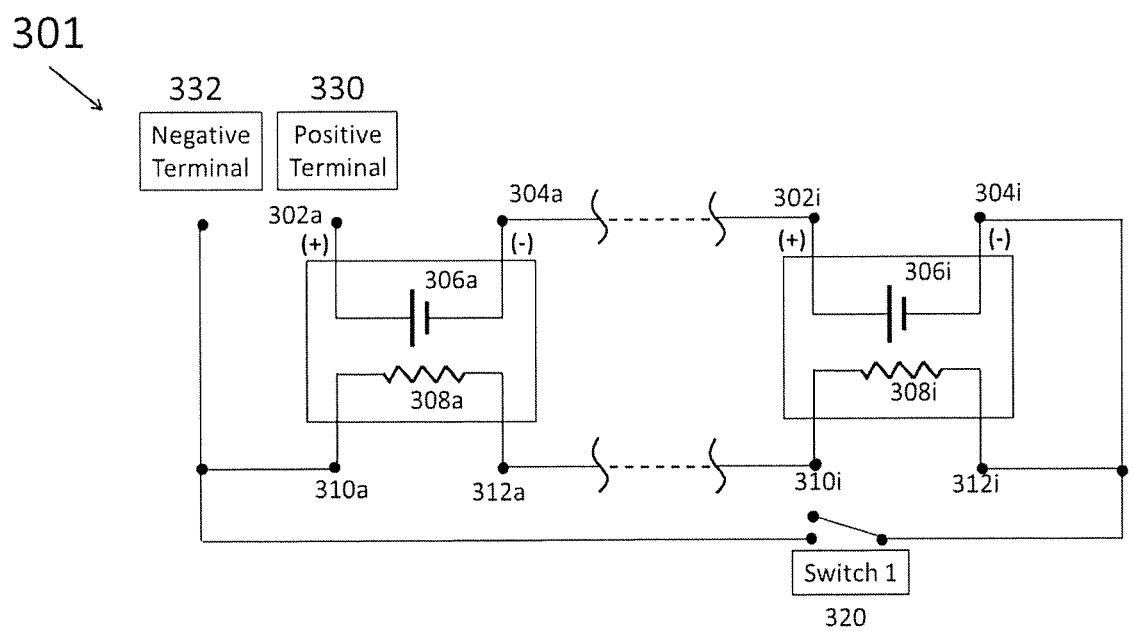
FIG. 3B shows an example of a battery system having a serial connection between a plurality of ASLB cells and the resistor sheets and Switch 1 controlling the resistor level of the system.

For example, FIG. 3B schematically illustrates an all solid-state lithium battery system (301) having a negative terminal (332), a positive terminal (330), a switch (320) and a plurality of cells (306a to 306i) and resistor sheets (308a to 308i) electrically connected in series. As shown in the figure, a positive terminal (302a) of a first cell (306a) is electrically connected to positive terminal 330. The negative terminal (304a) of first cell (306a) is electrically connected to the positive terminal (302i) of another cell (306i). Each of the cells can include a cathode electrode, anode electrode and solid electrolyte (not shown for illustrative convenience). Further, the battery pack can include any number of cells, e.g., from about 3 to about 200 and any number of resistor sheets serially connected between the first cell and the last cell. The terminals of the resistor sheets (312a to 310i) are also electrically connected in series. Switch 320 is electrically connected in parallel to the resistor sheets (308a to 308i) via resistor tabs 310a and 312i. Switch 320 is also electrically connected to negative terminal 332.

The ASLB system pack of FIG. 3B can be operated in the same manner as described for FIG. 1B. That is, the ASLB is configured to have two resistance levels, $R_1$ and $R_2$. When the battery temperature is too low for optimal operation, e.g., below $T_1$, the switch is off (i.e., in the OPEN state), and the battery pack operates at high resistance. When the battery temperature reaches the optimal range, e.g. above $T_1$, the switch is on (i.e., in the CLOSED state), and the battery pack operates at the low resistance level.

Figure 4:
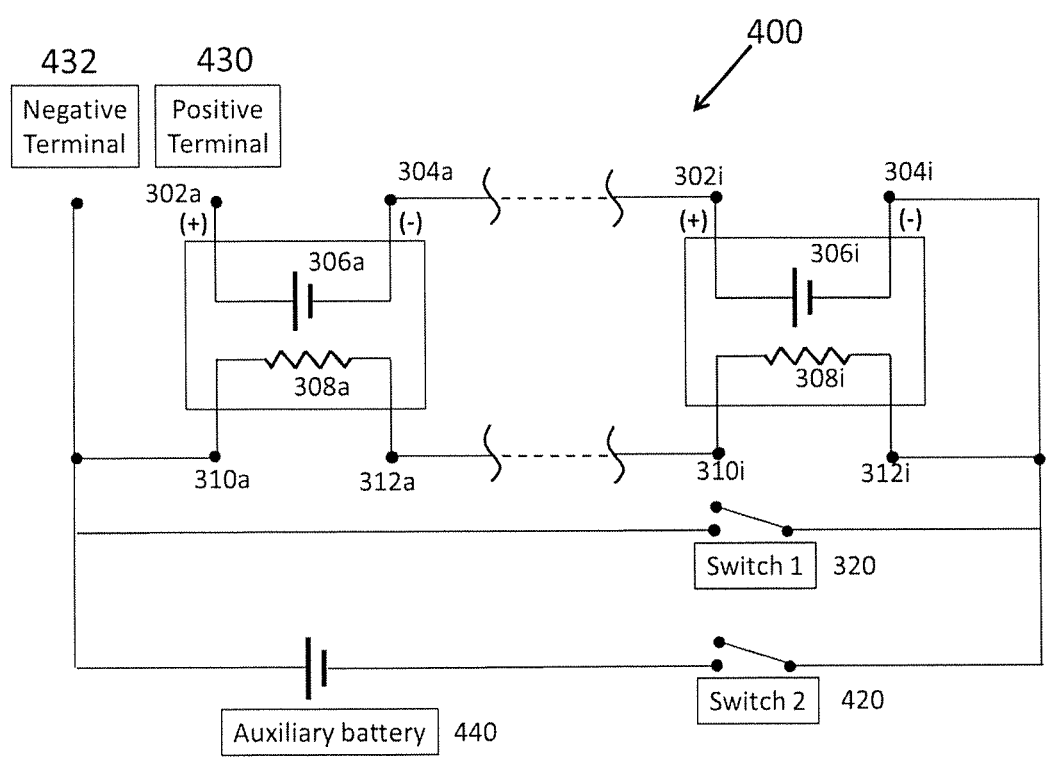
FIG. 4 shows an example of an ASLB system with an auxiliary battery. When the ambient temperature is too low for an ASLB to activate and power itself, the second battery with better low-temperature performance, such as Li-ion batteries with liquid electrolytes, can be used to power the resistor sheets embedded in the ASLB and heat up the ASLB.

Another aspect of the present disclosure includes a battery system that includes an ASLB of the present disclosure and a second, auxiliary battery to operate the resistor sheets of the ASLB. FIG. 4 illustrates an embodiment of such a battery system. In this embodiment, the battery system includes an auxiliary battery (440) and a switch (420) to electrically connect the battery to the resistor sheets of an ASLB of the present disclosure. In this embodiment, the ASLB includes the same components as described for FIG. 3B for ease of reference. As shown in FIG. 4, the system includes a negative terminal (432), a positive terminal (430), switch (420) and the components of an embodiment of an ASLB of the present disclosure, e.g., a plurality of cells (306a to 306i) and resistor sheets (308a to 308i) and switch 320.

The battery system of the present disclosure allows operation of the resistor sheets when the temperature is too low for the ASLB to power itself. For example, when the ambient temperature is too low for the ASLB to output reasonable power, the auxiliary battery with better low-temperature performance, such as a Li-ion battery with a liquid electrolyte, can be used to power and heat up the resistor sheets and hence the ASLB.

For example, when the ASLB temperature is below a temperature that is too low for the ASLB to power itself via ohmic modulation ($T_0$) (where $T_0<T_1$), the ASLB battery is set at open circuit, e.g. switch 320 is set to OPEN. Switch 420, which is serially connected with auxiliary battery 440, is turned on by a controller. In this way, the resistor sheets inside the ASLB are connected to the second auxiliary battery that can operate below $T_0$ and heat up the ASLB. Once the ASLB temperature reaches $T_0$, Switch 2 is off and ohmic modulation by ASLB itself comes into play as fully described above.

Another configuration of the present disclosure includes an ASLB system having a plurality of cells and plurality of resistor sheets. The plurality of electrochemical storage cells can be divided in subgroups and each subgroup of cells can be included in a high or low resistance state at different time, i.e. a cascade activation. For example, the plurality of electrochemical storage cells can be arranged in more than one subgroup of cells (i.e., in a pack or module of cells), wherein each subgroup of cells has one or more resistor sheets and each subgroup of cells has one or more switches that can direct current through the one or more resistors sheets to form a High Resistance State or that can direct current to bypass the one or more resistors sheets to form a Low Resistance State. With this arrangement, a temperature can be determined for each subgroup of cells and the one or more switches in each subgroup of cells can be operated in either in the High Resistance State or the Low Resistance State based on the temperature of the particular subgroup of cells. Operating each subgroup of cells in either the High Resistance State or the Low Resistance State can be done at different times, i.e. a cascade activation, rather than operating all of groups at more or less the same time. Cascade activation of modules can be used in combination with an auxiliary battery and either discharging or charging of the cells.

Figure 5:
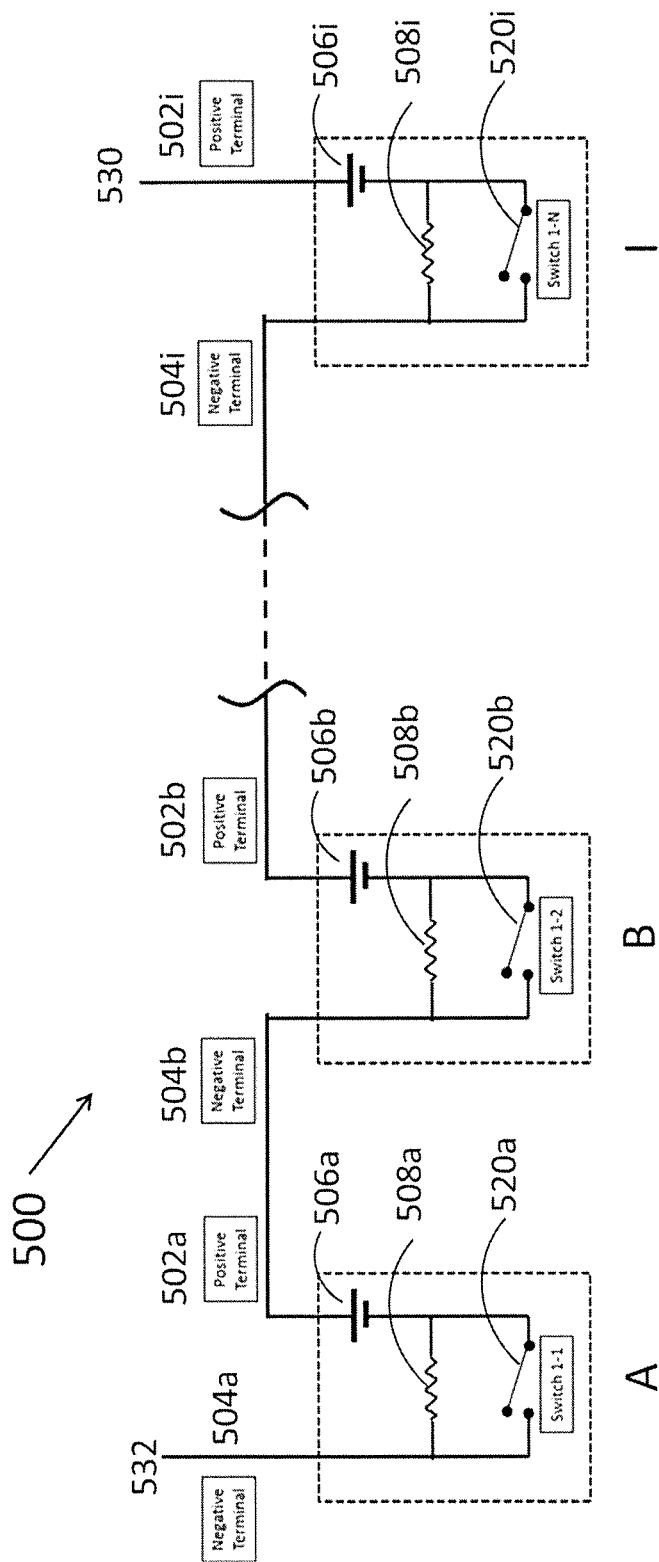
FIG. 5 shows an example of cascading activation of an ASLB system. When the ambient temperature is too low to activate and power an entire ASLB pack, the pack can be divided into several subgroups. The resistor sheets in one subgroup of cells can be activated and powered by the current generated from both the subgroup of cells and other subgroup of cells.

FIG. 5 schematically illustrates an embodiment of an ASLB system having a plurality of cells and plurality of resistor sheets. The cells can be divided into several subgroups of cells, which can also be referred to as a module or pack of cells. In this embodiment, the cells are divided into subgroup A, B, up to subgroup I. Subgroup A includes a plurality of cells (represented by 506a) which can be electrically connected in series and a plurality of resistor sheets (represented by 508a) which can be electrically connected in series and at least one switch (520a) that can form a low resistance circuit by electrically connecting the plurality of cells to bypass the resistor sheets (Low Resistance State) and that can form a high resistance circuit by electrically connecting the plurality of cells through the plurality of resistor sheets (High Resistance State). Subgroup B also includes a plurality of cells (506b), a plurality of resistor sheets (508b) and at least one switch (520b). The ASLB system of FIG. 5 can include additional subgroups of cells and resistor sheets up to a final subgroup illustrated as subgroup I, which also includes a plurality of cells (506i), a plurality of resistor sheets (508i) and at least one switch (520i).

The negative terminal (504a) of the first subgroup (subgroup A) is electrically connected to a negative terminal (532) for connecting the battery to a load and the positive terminal (502i) of the last subgroup (subgroup I) is electrically connected to a positive terminal (530) for connecting the battery to a load. Each of the subgroups are electrically connected in series by electrically connecting a positive terminal from one subgroup to the negative terminal of another subgroup (i.e., electrically connecting terminals 502a to 504b etc.).

Each of the subgroups of FIG. 5 can be arranged as shown in FIG. 3B. That is, each subgroup in FIG. 5 can have a plurality of cells and resistor sheets and a switch where each cell has a positive and a negative terminal that are electrically connected in series and each subgroup of cells has one or more resistor sheets serially connected between the first cell and the last cell. Each of the cells can include a cathode electrode, anode electrode and solid electrolyte. Each subgroup can include any number of cells, e.g., from about 3 to about 200 and any number of resistor sheets serially connected between the first cell and the last cell.

The ASLB system of FIG. 5 can be operated such that all of the subgroup of cells are in a high resistance state or low resistance state simultaneous or different subgroups can be activated in the high resistance state at different times. For example, one subgroup of cells can be activated by setting its switch to off (i.e., in the OPEN state) (High Resistance State) while the switches in the other subgroups are set to the CLOSED state (Low Resistance State). Under these circumstances, the electrical current of the activated subgroup and the electrical current from non-activated subgroups power the one or more resistor sheets of the activated subgroup to elevate its temperature. Other subgroups can then be activated. With regard to FIG. 5, a cascade activation can be implemented by activating one module only, say subgroup A, which can be done by turning switch 520a to the OPEN state and turning switches 520b and 520i to the CLOSED state. This way, only the resistor sheets in subgroup A are heated and thus subgroup A is activated. The ASLB system of this embodiment can also include an auxiliary battery to power the resistor sheets at low temperatures.

The battery configuration of the present disclosure can be applied to a variety of cathode materials, anode materials, and solid-state electrolyte materials. Such batteries are useful for transportation, aerospace, military, and stationary energy storage applications.

EXAMPLES

The following examples are intended to further illustrate certain preferred embodiments of the present invention and are not limiting in nature. Those skilled in the art will recognize, or be able to ascertain, using no more than routine experimentation, numerous equivalents to the specific substances and procedures described herein.

Three ohmically modulated ASLBs of 22 Ah were designed and modeled for performance. The performance of the batteries was modeled by AutoLion software customized for solid electrolyte batteries. (AutoLion software is available from EC POWER, LLC, 341 N Science Park Rd, State College, Pa. 16803). Each ASLB can comprise a pouch cell case and a stacked electrode-electrolyte assembly in it. The electrode-electrolyte assembly was designed as a plurality of positive electrode elements each comprising an aluminum current collector and a positive electrode coated on both sides of the current collector, a plurality of negative electrode elements each comprising a copper current collector and a negative electrode coated on both sides of the current collector, and an electrolyte material separating the adjacent positive electrode element and negative electrode element.

High-capacity Ni-rich NCM material (220 mAh/g) was chosen in the design formulation of all positive electrodes. A composition of 80/6/14 (wt %) NCM/carbon/solid electrolyte was chosen for this design. Lithium powder (LiP) was chosen to formulate all negative electrodes. A composition of 40/10/50 (wt %) LiP/carbon/solid electrolyte was chosen for the design. A thin film of solid electrolyte (5 μm) was chosen as the separator between the composite positive and negative electrodes of approximately 83 μm and 38 μm in thickness respectively.

Three solid electrolytes were modeled. The compositions of these electrolytes were chosen to be: (a) solid polymer electrolyte, poly(ethylene oxide):lithium bis(trifluoromethane sulfonyl) imide (PEO:LITFSI) of 18:1; (b) inorganic Garnet type solid electrolyte, $Li_6La_2BaTa_2O_{12}$; (c) single-ion conductor, anionic block copolymer electrolyte (A-BCE), i.e. P(STFSILi)-PEO-P(STFSILi), with 17% wt % of P(STFSILi). ASLBs designed with each of these electrolytes are labeled herein as ASLB(a), ASLB(b) and ASLB(c), respectively.

One of the negative electrode current collectors (the one in the middle of the electrode-electrolyte assembly) of the ASLBs was chosen to have a structure in which a resistor sheet is sandwiched by a pair of one-side coated copper foils (the uncoated foil surface is in contact with the resistor sheet). The resistor sheet chosen is a thin layer of nickel foil laminated by an electrical insulation film on its surfaces for anti-corrosion. The nickel foil has a thickness between 20 μm and 50 μm and designed into specific patterns to provide the required resistance. ASLB(a) and ASLB(b) included a resistor sheet having 27 mΩ resistance and ASLB(c) included a resistor sheet having 14 mΩ resistance. Each resistor sheet had two tabs, one of which is electrically connected to the tabs of the negative current collectors and the other forms the HiR(−) terminal of the ASLBs.

A switch between the LoR(−) and HiR(−) terminals is carried out by an electromechanical relay driven by a controller measuring the battery surface temperature. The relay is set to switch at temperature $T_1$. The ambient temperature is 25° C. for all three ASLBs, and $T_1$ is set at 50° C. for ASLB(a) and ASLB(b), while $T_0$ is set at 55° C. and $T_1$ is set at 80° C. for ASLB(c). This is because the solid electrolyte (c) barely provides any conductance below 55° C.

Three control batteries using the aforementioned three types of solid electrolytes but without the resistor sheet, i.e. conventional ASLBs, were also designed for comparison. The weight of the control batteries are c.a. 180 g and the weight of ohmically modulated ASLBs with resistor sheets embedded inside are about 185 g. Both occupy the same volume of about 0.093 L.

Figure 6:
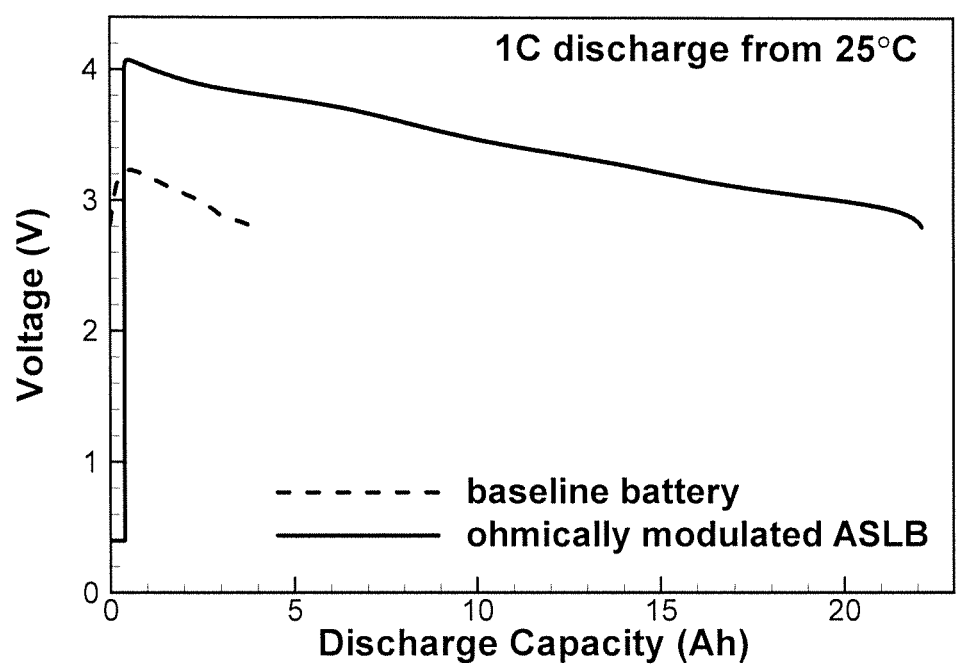
FIG. 6 shows modeled performance comparison between a conventional ASLB and an ASLB according to an embodiment of the present disclosure.

Modeled one-hour discharge curves of the ohmically modulated ASLB(a) and the baseline battery from 25° C. are shown in FIG. 6. In the case of ASLB(a) of the present disclosure, the battery discharge begins with a brief activation period where the high-resistance terminals were held at 0.4V for 20 seconds. The electrical current during activation varies from about 2 C to 4.5 C. In this period, the resistor sheet embedded inside the battery heats up rapidly and quickly warms up the battery interior. When the battery surface temperature reaches about 50° C., at which point the battery switches to the low internal resistance, the activation is completed and the battery thereafter undergoes a 1 C (22 A) discharge until the cut-off voltage (2.8V) is reached. The discharge curve of the ASLB(a) is contrasted to that of the baseline battery, showing substantially better voltage, capacity and energy output. Despite consumption of 1.7% battery capacity during activation, the ASLB(a) is able to deliver almost full capacity (22 Ah), in contrast to only 4.5 Ah dischargeable capacity of the baseline battery, e.g., over a four-fold increase in discharge capacity. Surface coatings or additives may be added in the high-voltage NCM cathode to improve its stability with PEO-based electrolyte.

Similar 1 C discharge processes of ASLB(b) and ASLB(c) and their respective baseline batteries were carried out. All of the ASLBs of the present disclosure were able to be activated within 20 s with less than 2% battery capacity consumption. The 1-hr dischargeable energy, gravimetric and volumetric energy densities of ASLB(a), ASLB(b), ASLB(c) and their corresponding baseline batteries are shown in Table 1.

TABLE 1

Dischargeable energy comparison of baseline batteries and ohmically modulated ASLBs

|  | Discharge Energy (Wh) | Specific Energy (Wh/kg) | Energy Density (Wh/L) |
|---|---|---|---|
| Baseline(a) 25° C. | 11.8 | 64 | 127 |
| ASLB(a) 25° C. | 74.5 | 403 | 801 |
| Baseline(b) 25° C. | 16.7 | 90 | 179 |

TABLE 1-continued

Dischargeable energy comparison of baseline batteries and ohmically modulated ASLBs

|  | Discharge Energy (Wh) | Specific Energy (Wh/kg) | Energy Density (Wh/L) |
|---|---|---|---|
| ASLB(b) 25° C. | 68.6 | 371 | 738 |
| Baseline(c) 55° C. | 3.5 | 19 | 38 |
| ASLB(c) 55° C. | 45.6 | 246 | 490 |

As shown by Table 1, ASLB(a) and ASLB(b) can deliver about 400 Wh/kg specific energy and 800 Wh/L energy density starting from room temperature, which are improvements of 530% and 312% compared to the baseline battery. The improvement of ASLB(c) is more substantial, from 19 Wh/kg to 246 Wh/kg (i.e. a greater than 12-fold improvement).

Only the preferred embodiments of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. An all solid-state lithium battery comprising:
   a solid electrolyte;
   at least two terminals configured to operate the battery at one level of internal resistance ($R_1$) over a temperature range of the battery between a first temperature ($T_1$) and a second temperature ($T_2$);
   at least one high resistance terminal configured to operate the battery at a second level of internal resistance ($R_2$) when the temperature of the battery is outside the temperature range between $T_1$ and $T_2$;
   at least one resistor sheet within a cell of the battery, wherein the at least one resistor sheet is configured to have at least two tabs with one tab electrically connected to one of the at least two terminals for operating the battery at $R_1$ and the other tab of the at least one resistor sheet electrically connected to the at least one high-resistance terminal; and
   a switch that activates $R_2$ when the temperature of the battery is outside the temperature range between $T_1$ and $T_2$.

2. The all solid-state lithium battery according to claim 1, wherein $T_1$ is a value between and including from 20° C. to 60° C. and $T_2$ is a value between and including from 80° C. to 120° C.

3. The all solid-state lithium battery according to claim 1, comprising a stack including electrodes and the solid electrolyte wherein the at least one resistor sheet is sandwiched within the stack.

4. The all solid-state lithium battery according to claim 1, wherein the at least one resistor sheet is flat with a large surface area and in direct contact with components in the cell of the battery.

5. The all solid-state lithium battery according to claim 1, wherein the switch is driven by a temperature controller and configured to switch between the terminals for operating the battery at $R_1$ and the terminals for operating the battery at $R_2$.

6. The all solid-state lithium battery according to claim 1, wherein the switch is self-activated thermally for switching between the terminals for operating the battery at $R_1$ and the terminals for operating the battery at $R_2$.

7. The all solid-state lithium battery according to claim 1, wherein the battery comprises a plurality of electrochemical storage cells that are arranged in more than one subgroup of cells, wherein each subgroup of cells has one or more resistor sheets, wherein each resistor sheet is configured to have at least two tabs with one tab electrically connected to one of the at least two terminals for operating the battery at $R_1$ and the other tab electrically connected to the at least one high-resistance terminal and each subgroup of cells has one or more switches that can direct current through the one or more resistors sheets to form a High Resistance State or that can direct current to bypass the one or more resistors sheets to form a Low Resistance State.

8. A battery system comprising the all solid-state lithium battery according to claim 7 and a controller that can switch between operating the battery at $R_1$ and operating the battery at $R_2$.

9. The battery system according to claim 7, further comprising a temperature sensor for determining $T_1$ and/or $T_2$.

10. The battery system according to claim 7, further comprising an auxiliary battery to power the one or more resistor sheets.

11. A method of operating an all solid-state lithium battery having at least two levels of internal resistance according to claim 1, the method comprising operating the battery at one level of internal resistance ($R_1$) over a temperature range of the battery between a first temperature ($T_1$) and a second temperature ($T_2$), and operating the battery at a second level of internal resistance ($R_2$) outside of either $T_1$ or $T_2$ by activating the switch that activates $R_2$ when the temperature of the battery is outside of either $T_1$ or $T_2$.

12. The method of claim 11, wherein $T_1$ is a value between and including from 20° C. to 60° C. and $T_2$ is a value between and including from 80° C. to 120° C.

13. The all solid-state lithium battery according to claim 1, wherein a value of $R_2/R_1$ is between and including 2 to 500.

14. The all solid-state lithium battery according to claim 1, wherein the at least one high resistance terminal is an additional negative terminal.

15. The all solid-state lithium battery according to claim 1, wherein the at least one resistor sheet directly contacts either a cathode electrode or an anode electrode of a cell of the battery.

16. The all solid-state lithium battery according to claim 1, comprising at least one cell having at least one cathode electrode, at least one anode electrode and the solid electrolyte therebetween, wherein the cathode comprises sulfur or a composite thereof.

17. The all solid-state lithium battery according to claim 1, wherein the switch includes an electromechanical relay and a temperature controller, a solid-state relay with a temperature sensor, a power MOSFET with a temperature sensor, a high-current switch with a temperature sensor or a bimetal switch.

18. The all solid-state lithium battery according to claim 1, wherein the at least one resistor sheet has a resistance in units of Ohm equal to the numerical value of between 0.1 to 5 divided by the battery's capacity in Amp-hours (Ah).

19. The all solid-state lithium battery according to claim 1, wherein the at least one resistor sheet is made of nickel, chrome, nichrome, aluminum, or combinations thereof.

20. An all solid-state lithium battery comprising:
plurality of electrochemical cells each having a solid electrolyte;
at least a positive and a negative terminal configured to operate the battery at one level of internal resistance ($R_1$) over a temperature range of the battery between a first temperature ($T_1$) and a second temperature ($T_2$);
at least one high resistance terminal configured to operate the battery at a second level of internal resistance ($R_2$) when the temperature of the battery is outside the temperature range between $T_1$ and $T_2$;
a plurality of resistor sheets electrically connected in series and within the plurality of electrochemical cells of the battery, wherein each resistor sheet of the plurality of resistor sheets is configured to have at least two tabs with one tab electrically connected to either the positive or negative terminal of the battery for operating the battery at $R_1$ and the other tab electrically connected to the at least one high-resistance terminal; and
a switch that activates $R_2$ when the temperature of the battery is outside the temperature range between $T_1$ and $T_2$, wherein the switch is electrically connected in parallel to the plurality of resistor sheets.

\* \* \* \* \*